Oct. 18, 1932.   J. J. EYRE ET AL   1,882,790
PORTABLE CUTTING TOOL
Filed Oct. 9, 1931
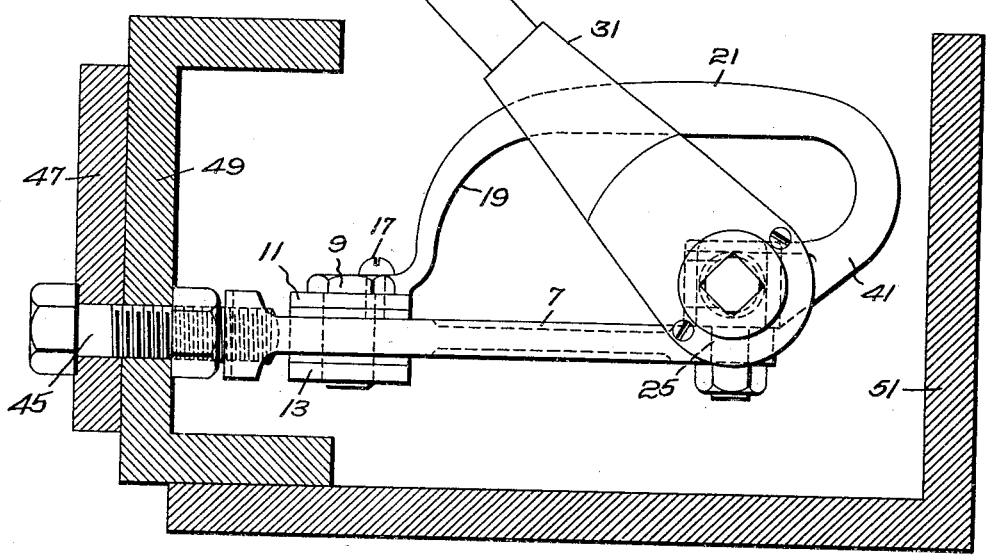
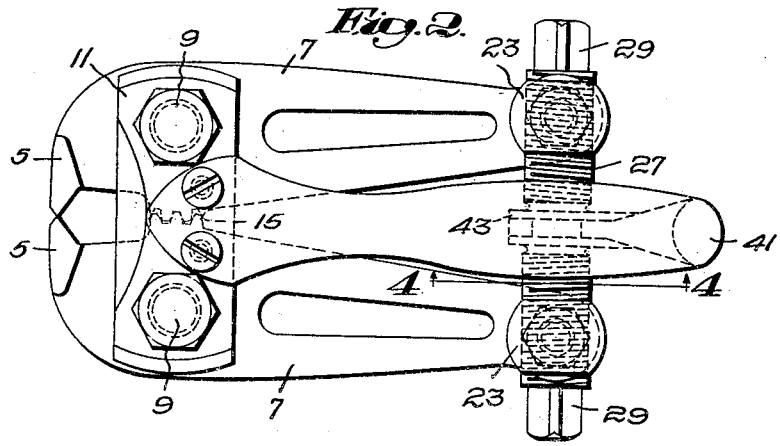
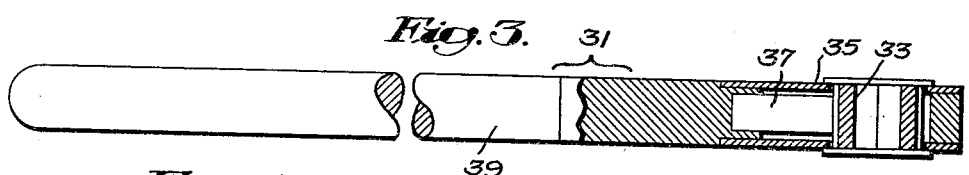
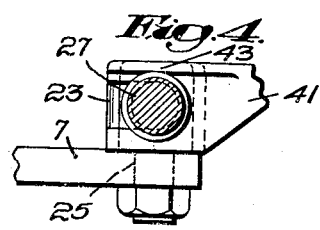
Inventors:
John J. Eyre,
Henry W. Porter,
By Emery, Booth, Varney & Townsend
Attys Patented Oct. 18, 1932

1,882,790

UNITED STATES PATENT OFFICE

JOHN J. EYRE, OF SAUGUS, AND HENRY W. PORTER, OF BROOKLINE, MASSACHUSETTS, ASSIGNORS TO H. K. PORTER, INC., OF EVERETT, MASSACHUSETTS, A CORPORATION OF MASSACHUSETTS

PORTABLE CUTTING TOOL

Application filed October 9, 1931. Serial No. 567,902.

This invention relates to portable cutters and the object is to provide a compact and handy but powerful tool of this nature.

Our invention will be well understood by reference to the following description taken in connection with the accompanying drawing, wherein:—

Fig. 1 is a side elevation of the cutting mechanism with part broken away showing it in use;

Fig. 2 is a plan of the cutter proper;

Fig. 3 is a broken edge elevation, partly in section, of the ratchet wrench which may be utilized in operating the structure shown in Fig. 2; and Fig. 4 is a detail section on line 4—4 of Fig. 2.

Referring to the drawing, particularly to Fig. 2, I have there shown a tool having the cutting blades 5 which in the example shown are of the nipper type rather than of the shear type and end cutting rather than side cutting, although neither of these characteristics is essential. One of the blades is adapted to swing into cooperation with the other to make the cut and in the example shown both move, being formed on short cutter levers 7 which are pivoted at points between their ends. Herein each lever has its own pivot pin 9 which extends between the upper and lower straps 11 and 13 between which the levers are received. The levers may be provided with gear teeth 15 so that their movements are equal and opposite. The straps 11 and 13 and the pivot pins 9 may be considered as an example of a base on which the cutter members are pivotally mounted.

For presenting the tool to the work we provide a handle rising from the base and herein consisting of a separate piece secured by screws 17 to the strap 11 and comprising a portion 19 rising upwardly and a portion 21 continuing rearwardly substantially in a plane parallel to that in which the levers swing to provide a hand grip. This hand grip is disposed laterally of the unit formed by the cooperating levers and in such relation to its center of gravity as to permit the tool to be picked up by one hand, held in suspended position and moved or directed easily.

To permit the short levers 7 to be powerfully operated we utilize a screw cooperating with the rear ends of the levers and we herein show nuts 23 carried by studs 25 which are swivellingly mounted in the ends of these levers, and with these nuts cooperates a right and left hand screw 27. Means are provided, preferably adjacent both ends of the screw, for the application of a turning tool thereto and herein the extreme ends 29 outwardly of the nuts 23 are squared to receive a wrench, preferably a ratchet wrench 31 having the socket 33 provided with teeth 35 adapted to be driven by the pawl 37 operated by the handle 39. Ratchet wrenches of this type are well known and require no detailed illustration or extended description.

The handle 19—21 by which the tool is supported is herein shown as provided at its rear end with the recurved portion 41 (see Figs. 1 and 4) having a forked end 43 engaging about a reduced central portion of the screw 27. A handle is thus provided of loop form. In the embodiment of the invention shown wherein the levers are geared together at 15, it is not necessary that the bearing at 43 be relied upon to position the screw against endwise movement. The heavy screw, however, serves to support the handle and maintain it in its longitudinal plane and the two points of support suspend the tool from the handle grip 21 in a convenient manner facilitating the manipulation of the tool and its support against angular displacement when the wrench is applied or when the latter is carelessly used.

Cutting levers pivoted together in the manner shown and operated by handles constituting therewith a compound lever system, such, for instance, as those shown in the patent to Porter No. 484,670, Oct. 18, 1892, are well known. Such tools are efficient but necessarily bulky. A tool of the type herein disclosed having an overall dimension of about seven inches including the overhang of the handle as seen in Fig. 2, the distance between the center 9 and the adjacent center 25 being about four inches, has a capacity equivalent to a tool of the type just mentioned twenty-four inches in length. Its small size and convenient manipulation also make it adaptable for many purposes. In Fig. 1 we have illustrated an example in which the tool is nipping off the end of a bolt 45 which secures plate 47 to the web of channel 49. It will be seen that a long pair of nippers could not reach the bolt because of the presence of the angle 51. At the same time because of the overhang of the upper flange of the channel 49 it would be impossible to get access to the bolt from above with a chisel and hammer. The tool just described can be inserted in the close quarters shown, held easily with one hand and operated. When the operating lever takes the form of a ratchet wrench as described, the operation is reasonably rapid and the required range of reciprocation of the handle of the wrench is small.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. A portable cutting tool comprising a base, a pair of cutter levers pivotally mounted thereon, a handle extending upwardly and rearwardly from said base, and a right and left screw cooperating with the tails of said levers for moving the same and having means adjacent both ends thereof for engagement of a turning tool therewith, said handle having a depending end provided with a bearing receiving said screw between the ends of the latter.

2. A portable cutting tool comprising a base, a pair of cutter levers pivotally mounted thereon for equal and opposite swinging movement, a right and left screw carried by the rearward ends of said levers for moving the same, and a laterally disposed loop-shaped handle having one end secured to said base and the other positioned by the central portion of said screw.

3. A portable hand-operated cutting tool comprising cooperatively pivoted cutter levers, a screw extending between said levers for operating the same having means providing for turning of the same by means of an operating lever and a relatively stationary handle for supporting said parts having a substantially centrally located longitudinally extending hand grip disposed at one side of the plane of lever movement substantially directly above said levers whereby to permit ready presentation of said tool and support thereof, while the screw is being operated, by one hand.

4. A portable hand-operated cutting tool comprising a base, a part supported from said base having a cutting edge, a cutter lever pivotally mounted on said base having a cooperating edge, a screw engaging the rearward end of the lever for swinging the same having means providing for turning the same by an operating lever and a handle for the unit recited arising from said base adjacent the pivot and extending upwardly and rearwardly therefrom to provide a hand grip disposed directly above said unit at one side of the plane of lever movement by which the tool may be suspended.

In testimony whereof, we have signed our names to this specification.

JOHN J. EYRE.
HENRY W. PORTER.